United States Patent

[11] 3,591,961

| [72] | Inventors | Charles D. Woodward;<br>Arthur P. S. Hyde, both of Saginaw, Mich. |
|---|---|---|
| [21] | Appl. No. | 886,254 |
| [22] | Filed | Dec. 18, 1969 |
| [45] | Patented | July 13, 1971 |
| [73] | Assignee | General Motors Corporation<br>Detroit, Mich. |

[54] AIR PUMP FLOW CONTROL VALVE FOR ENGINE EXHAUST EMISSION CONTROL SYSTEM
7 Claims, 5 Drawing Figs.

[52] U.S. Cl. .................................................. 60/30, 137/115
[51] Int. Cl. ..................................................... F01n 3/10
[50] Field of Search............................................ 60/30; 137/115, 119

[56] References Cited
UNITED STATES PATENTS

| 3,392,523 | 7/1968 | Hyde .............................. | 60/30 |
| 3,430,437 | 3/1969 | Sausselle ....................... | 60/30 |
| 3,479,816 | 11/1969 | Masters........................... | 60/30 |
| 3,520,320 | 7/1970 | Crawford ...................... | 137/115 |

*Primary Examiner*—Douglas Hart
*Attorneys*—Jean L. Carpenter and Arthur N. Krein ABSTRACT: An engine having an exhaust air injection system in which an engine-driven pump delivers air to the stream of exhaust gases as they are emitted from the combustion chamber and is equipped with a flow control valve which opens at high engine speeds to divert air from the exhaust air injection system prevent excessive exhaust system back pressure and resulting power loss.

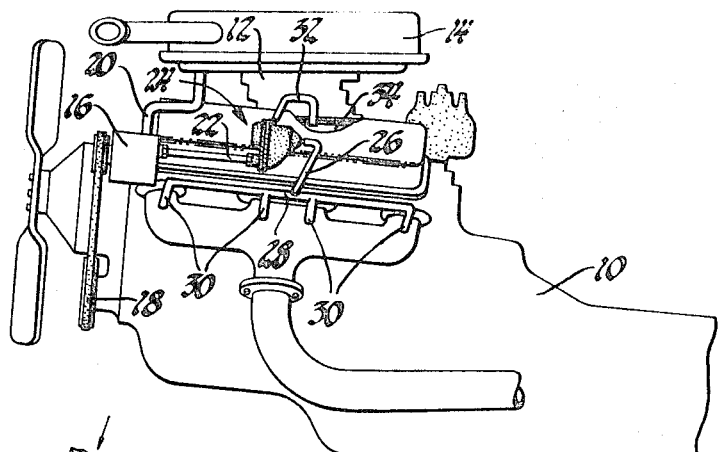
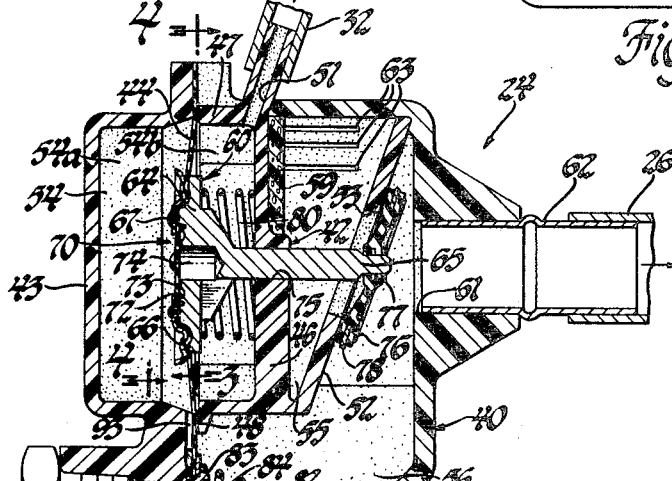

AIR PUMP FLOW CONTROL VALVE FOR ENGINE EXHAUST EMISSION CONTROL SYSTEM

During recent years, increasing emphasis has been placed on reducing the amount of unburned constituents, such as hydrocarbons and carbon monoxide, present in the exhaust gases emitted from internal combustion engines. One of the most effective arrangements devised to accomplish this reduction is the air injection reactor system. In this system, an engine-driven air pump delivers air to the stream of hot exhaust gases as they are emitted from the engine combustion chambers. Utilizing the heat of the exhaust gases, the injected air supports additional burning of the exhaust gases in the engine exhaust passages to reduce the amount of unburned constituents in the exhaust gases.

An engine-driven air pump is used in this system because it is the most economical arrangement for supplying the additional air to the stream of exhaust gases in the amounts normally required during engine operation. Since the air pump is normally driven directly from the engine through a belt-and-pulley arrangement, the pump speed and therefore, its output, will vary with engine speed. However, at the higher engine speeds, the air-fuel ratio of the combustion mixture supplied to the engine is such that complete combustion of this mixture occurs in the combustion chambers of the engine with a resulting low emission in the exhaust gases. Accordingly, additional air is not required to be introduced into the stream of exhaust gases as they are emitted from the combustion chambers during high engine speed operation. Of course, it is at the higher speed that the highest air pump flow rates occur, resulting in excessive exhaust system back pressure, and, of course, producing a resulting power loss at the high engine speed when this high airflow is introduced in the exhaust air injection system.

Accordingly, it is an object of this invention to improve an air pump flow control valve for use in an engine exhaust air injection reactor system whereby the air pump flow control valve is operable to divert excess air from the engine exhaust air injection system during high engine speed operation.

Another object of this invention is to provide an improved air pump flow control valve adapted to sense airflow in the exhaust air injection system pump discharge line and to divert this flow to atmosphere at a predetermined flow rate dependent upon engine speed.

These and other objects of the invention are attained by means of an air pump flow control valve connected to the discharge line of the engine-driven air pump in an exhaust air injection system, the valve assembly including a floating orifice and diaphragm in the valve housing, the floating orifice being positioned to receive the air discharged from the pump, whereby to move the diaphragm as a result of a predetermined pressure drop across the floating orifice to open a signal line which is connected to a diaphragm-driven diverter valve to block the passage of air to the exhaust air injection system and diverting the air to atmosphere.

For a better understanding of the invention, as well as other objects and further features thereof, reference is had to the following detailed description of the invention, to be read in connection with the accompanying drawings, wherein:

FIG. 1 is a view of an internal combustion engine which includes an air pump to inject air into the exhaust passages and which also includes the air pump flow control valve of this invention;

FIG. 2 is an enlarged sectional view of the air pump flow control valve of FIG. 1;

FIG. 3 is a sectional view along line 3—3 of FIG. 2 illustrating the flow control orifice;

FIG. 4 is a sectional view along line 4—4 of FIG. 2; and,

FIG. 5 is an enlarged view of a portion of FIG. 2 illustrating the bleed valve structure.

Referring first to FIG. 1, an internal combustion engine 10 is provided with a carburetor 12 and an air filter 14. An air pump 16, secured to the engine, is driven by it through belt 18. Air pump 16 has an inlet hose 20 through which clean air is drawn from air filter 14, and an outlet conduit 22 through which air is delivered via the flow control valve of the invention, generally designated 24, and hose 26 to an air manifold 28. Air manifold 28 has a series of injection tubes 30 through which air is injected into the stream of exhaust gases adjacent to the combustion chamber exhaust valves. Flow control valve 24 is also connected by hose 32 to the induction passage of the engine downstream of the throttle valve, not shown, of the carburetor, for example, as shown, hose 32 is connected to the intake manifold 34 of the engine for a purpose to be described.

Referring now to FIGS. 2 through 4, inclusive, the flow control valve 24 includes a housing 40 herein shown as essentially a three-part valve housing consisting of a main housing 41, an intermediate portion 42 and cover 43, made, for example, of a suitable plastic. A diaphragm 44, described in detail hereinafter, is sandwiched between the flange of cover 43 and the intermediate portion 42 and the flange of main housing 41 prior to securing these elements together as by rivets 45. Intermediate portion 42 includes a diaphragm-retaining cup portion formed by base 46 and an annular wall 47, the latter being provided at its outer free end with an annular sealing bead 48 in contact with the diaphragm 44, and a radial-projecting conduit 51 in communication with the interior of the diaphragm-retaining cup portion and through hose 32 to the intake manifold 34. A divider plate 52 integral with base 46 extends at an angle from it into engagement with a portion of housing 41, the divider plate 52 being provided with an aperture 53 for a purpose to be described.

As shown in FIG. 2, the above-described arrangement of the housing 41, intermediate portion 42 and cover 43 form essentially three chambers 54, 55 and 56 with the diaphragm 44 dividing chamber 54 into subchambers 54a and 54b. Chamber 56 is in communication via flow control orifice 82, to be described in detail hereinafter, and inlet conduit 58 in cover 43 with the outlet conduit 22 from air pump 16, and at its other end, via discharge conduit 61 and tube 62 through hose 26 with the air manifold 28. Chamber 56 is also adapted to be in communication with chamber 55 via aperture 53 which serves as the inlet to the chamber 55. Discharge from chamber 55 to the atmosphere is through a plurality of slots 63 provided in the outer wall of housing 41 adjacent to the muffler material 59 cemented to the wall of base 46 in chamber 55.

The diaphragm 44 is provided with a circular opening at one end and is clamped at this end between the annular head 64 of shaft 65 and the annular outer end of centrally apertured retainer 66, which encircles the diaphragm around the opening therein and which is staked in place by means of pins 67 protruding from head 64, the pins 67 extending through suitable apertures in the radially inward-directed fingers 68 of retainer 66. These fingers 68 of the retainer also position a valve element 70 in the recessed end of the head 64. Valve element 70, which is a disc of flexible material is provided with an arcuate slot 79 therein to form a flapper bleed valve portion 71 which overlies an annular recess 72 in the head 64 with the arcuate slot therein in communication via a bleed groove 73 with a central bore passage 74 in the head 64 which in turn is in communication with the subchamber 54b.

Shaft 65 of the plunger 60 is suitably journaled in an aperture 75 in base 46 with its reduced end extending through aperture 53 to support a diverter valve 76 secured thereon as by retainer ring 77 positioned in a suitable annular groove formed in the reduced end of the shaft. The diverter valve 76, as shown, consists of an annular valve portion made of a suitable flexible material, such as rubber, and provided with a steel annular reinforcing washer 78 bonded therein. A coil spring 80 encircles shaft 65 with one end of the spring engaging base 46 and its other end engaging head 64 to normally bias the diverter valve to the left, as seen in FIG. 2, into sealing engagement against divider plate 52 to normally block communication between chambers 55 and 56.

Diaphragm 44 is also provided at its lower end, as seen in FIG. 2, with an aperture 81 in alignment with inlet conduit 58 in cover 43 to receive the flow control orifice element 82. The flow control orifice element 82 includes a cylindrical body portion 83 having a tapered orifice opening 84 therethrough and a radially extending flange 85 provided with a bleed notch 86 at the upper end thereof, as seen in FIG. 3. Flow control orifice element 82 extends partially through aperture 81 in diaphragm 44 with the reduced end of the tapered orifice opening 84 facing downstream, that is, toward conduit 58, and is secured to the diaphragm by engagement of flange 85 with one side to the diaphragm and by engagement of retainer ring 87, positioned in a suitable annular groove in body portion 83, engaging the other side of the diaphragm.

Flow control orifice element 82 is normally biased into seating engagement against cover 43 by means of a coiled spring 88 encircling at one end boss 91 of main housing 41, and at its other end encircling the body portion 83 in engagement with retaining ring 87. In this seating engagement with cover 43, the flow control orifice element abuts against pads 92 which extend outward from the enlarged recessed end of inlet conduit 58. In this normal position of the flow control orifice element 82, air from inlet conduit 58 is sealed from bleed groove 93 by means of diaphragm 44 on the upper pad 92, as seen in FIG. 3, the bleed groove 93 extending into the upper cup-shaped portion of cover 43 forming part of subchamber 54a. Spring 88 keeps the flow control orifice in its normal seated position and also, due to its biasing action, determines the pressure drop across the orifice necessary to effect movement of the flow control orifice element.

During engine operation, the air pump 16 is continually operated to discharge air through outlet conduit 22 into the inlet conduit of the flow control valve 24. The air delivered to inlet conduit 58 then passes through the tapered orifice opening 84 of the flow control orifice 82 and enters chamber 56 from which it is normally discharged via outlet conduit 61, tube 62 and hose 26 to the air manifold 28 for discharge into the combustion chamber via injection tubes 30.

A small portion of the air passing through inlet conduit 58 could bleed from the upstream side of the flow control orifice element 82 to the subchamber 54a through the bleed notch 86 in flange 85 and bleed groove 93, previously described. During low engine speed operation, the amount of pressurized air entering subchamber 54a is insufficient to effect movement of the diaphragm head 64 and shaft 65 assembly to the right as seen in FIG. 2 against the biasing action of spring 80 to unseat the diverter valve 76, even though subchamber 54b is at a reduced pressure because of its connection to the intake manifold of the engine. In addition, the flapper bleed valve 71 as arranged on the annular head 64, as previously described, permits a continuous bleeding of air from subchamber 54a to subchamber 54b, thereby preventing a substantial differential in pressure to exist between these two subchambers during low speed engine operation.

As the engine speed increases, the output from the air pump 16 will, likewise, proportionately increase, so that as the airflow increases, there will be an increase in the pressure drop across the flow control orifice element 82. At some predetermined flow, relative to engine speed, the pressure drop across the flow control orifice element 82 will be sufficient to effect movement of the flow control orifice element 82 to the right, as seen in FIG. 2, against the biasing action of spring 88 to cause this element to unseat and permit a substantial flow of air into subchamber 54a to force the diaphragm 44, separating this subchamber from subchamber 54b to move to the right, as seen in this same figure, against the biasing action of spring 80 to unseat the diverter valve 76 from the divider plate 52 and to move it into sealing engagement against the wall of the housing 41 surrounding the outlet conduit 61. When this occurs, the airflow from air pump 16 is prevented from passing into the air manifold 28, the air now flowing from chamber 56 into chamber 55 to be discharged through slots 63 to the atmosphere. In this way, no additional air is being injected into the exhaust gases, adjacent to the combustion chamber exhaust valves, thereby preventing excessive exhaust system back pressure and the resulting loss in power. As long as this higher engine speed is maintained, the output from air pump 16 will continually be diverted to atmosphere.

When the engine speed is reduced, the flow of air from air pump 16 through the flow control orifice element will decrease resulting in a decrease in pressure differential across the flow control orifice element 82 until such time that the spring 88 will again return the flow control valve element to the position shown in FIG. 2, thereby cutting off the flow of air from conduit 58 into subchamber 54a. The pressure differential between the subchambers 54a and 54b is then substantially reduced by the passage of air between these subchambers through the flapper bleed valve 71. This will then permit the spring 80 to again bias the diaphragm and therefore the diverter valve to the left, as seen in FIG. 2, until the diverter valve is again seated against the divider plate 52 to block the passage of air from chamber 56 into chamber 55, the air in chamber 56 then being discharged through the outlet conduit 61, as previously described.

However, during rapid engine deceleration from any speed, a high vacuum is produced in the induction passage of the engine including intake manifold 34 and through the hose 32 in the subchamber 54b so that the resulting differential in pressure between subchambers 54a and 54b will cause the diaphragm 44 to move to the right, as seen in FIG. 2, against the biasing action of spring 80 to again unseat the diverter valve from the divider plate 52 whereby the air from chamber 56 is then discharged into chamber 55 and through the slots 63 to the atmosphere. At the same time, discharge of air from chamber 56 into the outlet conduit 61 is prevented by the movement of the diverter valve 76 into position against the inner face of main housing 41 adjacent to this outlet conduit. After a period of time, determined by the size of the bleed groove and passage 74 in head 64, the pressure in subchambers 54a and 54b will again be sufficiently balanced so that the spring 80 will move the diaphragm 44 to the left, as seen in FIG. 2, to close the diverter valve around the aperture 53 in divider plate 52.

If, before the pressure in chamber 54a is balanced with that in chamber 54b, the engine is accelerated to a speed less than that required to effect unseating of the flow control orifice element as previously described, the pressure in the intake manifold 34, and therefore subchamber 54b, rises rapidly. As this occurs, the flapper bleed valve 71 will then unseat to place passage 74 in direct communication with subchamber 54a so that the pressure in subchamber 54a may be quickly balanced with that in subchamber 54b. When the pressure in these two subchambers are substantially equalized, the flapper bleed valve 71 will again seat to cover passage 74 in the annular head 64. Airflow between these two subchambers is then again restricted by the amount of air flowing through bleed groove 73.

From the above description, it is apparent that the subject airflow control valve is capable of diverting excess air discharged by air pump 16 at high engine speeds as determined by the orifice size of the flow control orifice element and the biasing action of spring 88, and is also capable of diverting this air during periods of rapid deceleration to prevent excessive exhaust back pressure with the resulting loss in power.

What we claim is:

1. A flow control valve for use in the exhaust emission control system of an internal combustion engine having an intake manifold, an exhaust manifold defining a portion of a combustibles flow path and an air pump driven by the engine to supply air to the combustibles flow path for supporting burning of the combustibles, said flow control valve including a housing having a fluid inlet adapted for connection to the air pump, a first fluid outlet adapted to discharge air into the exhaust manifold and a second fluid outlet for discharge to atmosphere, chamber means interconnecting said fluid inlet, said first fluid outlet and said second fluid outlet, valve means positioned for movement from a first position blocking said second fluid outlet to a second position blocking said first fluid outlet, control means connected to said valve means for moving said valve means between said first position and said second position including a diaphragm having an aperture therein in alignment with said fluid inlet, a portion of said diaphragm dividing said housing into a first pressure chamber and a second pressure chamber separate from said chamber means, and a flow control orifice secured to said diaphragm to encircle said aperture therein and adapted for movement therewith in response to a predetermined flow rate of air therethrough to effect movement of said valve means.

2. A flow control valve according to claim 1 wherein said control means includes bleed passage means in said housing adjacent to said fluid inlet and extending from said flow control orifice to said first pressure chamber for restricted flow of air to said first pressure chamber and spring means positioned to normally bias said flow control orifice and diaphragm toward said fluid inlet to limit flow of air from said fluid inlet to said first pressure chamber.

3. A flow control valve according to claim 2 wherein said control means includes a control signal conduit extending into said second pressure chamber and adapted for connection to the intake manifold to subject the second pressure chamber side of said diaphragm to intake manifold pressure, means including a valve and a bleed passage for controlled passage of air between said first pressure chamber and said second pressure chamber and spring means positioned to bias said diaphragm and therefore said valve means to normally retain said valve means in said first position.

4. An exhaust emission control system for use on an internal combustion engine having an intake manifold and an exhaust manifold defining a portion of a combustibles flow path, said system comprising an air pump driven by the engine, discharge conduit means extending from said air pump, flow control means including a housing having a discharge chamber and a pressure responsive diaphragm further dividing said housing into a first chamber and a second chamber, said discharge chamber being positioned in flow relation to said discharge conduit means and having first outlet means connected to said exhaust manifold to deliver air from said air pump into said combustibles flow path for supporting burning of the combustibles and a second outlet means for discharge to atmosphere, diverter valve means positioned for movement between said first outlet means and said second outlet means and operatively connected to said diaphragm, means normally biasing said diaphragm and said diverter valve means to a position in which said diverter valve means blocks said second outlet means, a flow control orifice means operatively connected to said diaphragm and encircling an aperture therein in flow relation to said discharge conduit means through which air from said air pump flows into said discharge chamber, said flow control orifice means being movable at a predetermined flow rate of air to move said diaphragm to permit direct airflow from said discharge conduit means into said first chamber, bleed means adjacent to said flow control orifice providing a restricted passage for airflow from said discharge conduit means to said first chamber, a control signal conduit extending from said second chamber and adapted for connection to said intake manifold to subject the second chamber side of said diaphragm to intake manifold pressure, and means providing a restricted passage for airflow between said first chamber and said second chamber, said diaphragm being responsive to a decrease of predetermined rate in the intake manifold pressure sufficient to reduce the pressure on the second chamber side of said diaphragm below the pressure on the first chamber side of said diaphragm for predetermined interval to move said diverter valve means to unblock said second outlet means and to block said first outlet means, said diaphragm also being responsive to an increase in pressure on the first chamber side of said diaphragm to move said diverter valve means to unblock said second outlet means and to block said first outlet means.

5. An exhaust emission control system according to claim 4 wherein said flow control orifice means includes a flow control orifice secured to said diaphragm in alignment with an aperture therein, spring means to normally bias said flow control orifice in a direction to block airflow from said discharge conduit means into said first chamber while still permitting restricted airflow through said bleed means to said first chamber.

6. An exhaust emission control system according to claim 4 wherein said means providing a restricted passage for airflow between said first chamber and said second chamber includes a valve means for rapid passage of air from said second chamber to said first chamber and bleed means associated with said valve means for restricted passage of air between said first chamber and said second chamber.

7. An exhaust emission control system for use on an internal combustion engine having an intake manifold and an exhaust manifold defining a portion of a combustibles flow path, said system comprising an air pump driven by the engine, discharge conduit means extending from said air pump, flow control means including a housing divided by a pressure-responsive diaphragm to form a first chamber and a second chamber, an apertured divider means in said housing further dividing said housing into a third chamber and a fourth chamber, said fourth chamber being provided with outlet means to atmosphere, said third chamber being positioned in flow relation to said discharge conduit means and having outlet conduit means connected to said exhaust manifold to deliver air from said air pump into said combustibles flow path for supporting burning of the combustibles, valve means movable between open and closed positions relative to said apertured divider means and operatively connected to said diaphragm, a flow control orifice means connected to said diaphragm in said conduit means through which air from said air pump flows into said third chamber, said flow control orifice means being movable at a predetermined flow rate of air to move said diaphragm to permit direct airflow from said conduit means into said first chamber, a control signal conduit extending from said second chamber and connected to said intake manifold to subject the second chamber side of said diaphragm to induction pressure, means providing a restricted passage for airflow between said first chamber and said second chamber, said diaphragm being responsive to a decrease of predetermined rate in induction pressure sufficient to reduce the pressure on the second chamber side of said diaphragm below the pressure on the first chamber side of said diaphragm for a predetermined interval to move said valve from said closed position, said diaphragm also being responsive to an increase in pressure on the first chamber side of said diaphragm to move said valve from said closed position, and means biasing said diaphragm and valve to said closed position whereby said valve normally blocks the flow of air from said third chamber into said fourth chamber for discharge to the atmosphere.